Figure 1:
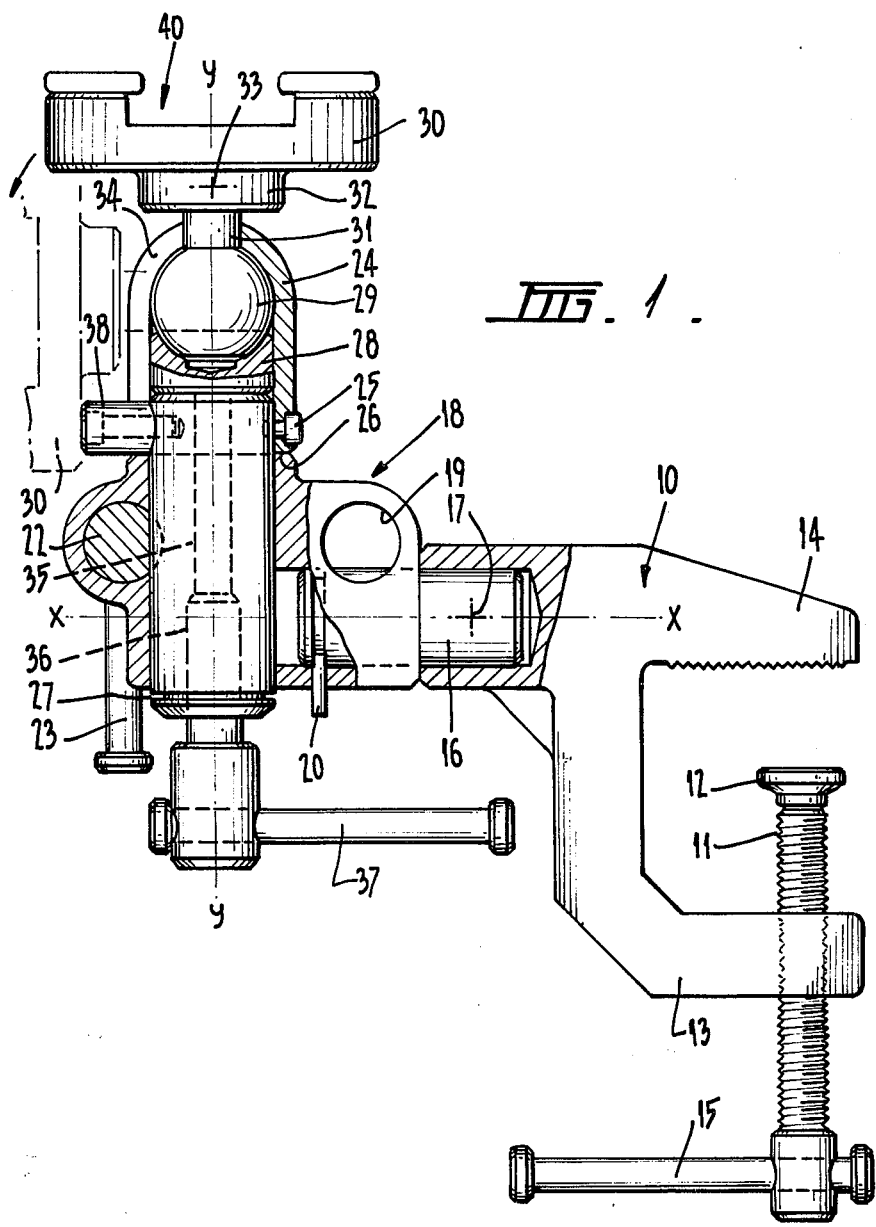

United States Patent [19]

Dalmau et al.

[11] 4,140,307
[45] Feb. 20, 1979

[54] VICES

[76] Inventors: Jordi A. Dalmau, 1 Moray St., East Bentleigh, Victoria, Australia, 3165; Bruce Sinclair, 12 Bowman St., Mordialloc, Victoria, Australia, 3195

[21] Appl. No.: 832,930

[22] Filed: Sep. 13, 1977 (Under 37 CFR 1.47)

[51] Int. Cl.² .............................................. B23Q 1/04
[52] U.S. Cl. ....................................... 269/71; 269/75; 269/97
[58] Field of Search ............................... 269/75, 71, 97

[56] References Cited

U.S. PATENT DOCUMENTS

| | | | |
|---|---|---|---|
| 2,106,525 | 1/1938 | Henry | 269/71 |
| 2,993,395 | 7/1961 | Bohn | 269/75 |
| 3,691,788 | 9/1972 | Mazziotti | 269/75 |

FOREIGN PATENT DOCUMENTS 535305  4/1931  United Kingdom ............... 269/75

*Primary Examiner*—Robert C. Watson

*Attorney, Agent, or Firm*—Lane, Aitken & Ziems

[57] ABSTRACT

The invention relates to a work support device in the form of a vice for rigidly supporting a work piece and enabling adjustment of the position of the workpiece to any desired angular position. The vice includes a pair of conventional vice jaws or a jig for holding the workpiece. The jaws or jig are mounted for rotational movement about a first axis when released from a locked position and also for tilting movement through 90° with respect to the first axis. This movement is achieved by mounting the jaws or jig on a ball of a ball and socket arrangement wherein the socket is slotted to enable said tilting movement. The socket arrangement is mounted for rotation, when released from a locked position, in a plane normal to the plane of rotation of the jaws or jig. Thus by a combination of rotational movement of the jaws or jig and the socket arrangement as well as tilting movement of the jaws or jig the workpiece may be disposed in any angular orientation and locked in said position. Locking is achieved by conventional clamping means.

2 Claims, 1 Drawing Figure

VICES

This invention relates to a work support device and in particular to a work support device adapted for attachment to a work bench, machine tool bed or the like to support a workpiece in a convenient and readily adjustable position. The device may take the form of a vice.

It is known to provide a vice having a work support head enabling swivelling of the workpiece about a single axis and tilting of the workpiece at an angle to said axis. Furthermore, it is known to provide various attachment means for work support devices to enable different workpieces such as engine cylinder heads and automobile transmissions to be held in a generally convenient and adjustable working position. However, it is often found in using the known devices, particularly for holding cylinder heads and transmissions, that the workpiece cannot be oriented in the most suitable working position without remounting it on the device particularly if it is necessary, for example, to completely invert the workpiece.

Thus it is an object of the present invention to provide a work support device capable of supporting a workpiece and enabling adjustment of the position of the workpiece, including adjustment to any desired angular position, to be quickly and easily made.

According to the invention there is provided a work support device comprising a first member adapted to attach said device to a workbench or the like and a workpiece mounting member adjustably connected to said first member in a manner facilitating infinite angular orientation of a workpiece mounted on said mounting member.

In order that the invention may be more easily understood one particular embodiment will now be described with reference to the accompanying drawing wherein, FIG. 1 is a perspective, part sectional view of a work support device according to the embodiment.

Referring now to the drawing the device is shown to comprise a clamping member 10 adapted to clamp the device to a workbench, machine tool or the like. The clamping member 10 is a generally U-shaped casting and includes a bolt 11 threaded into the lower arm 13 of the casting and adapted to force a rotatable cap member 12 on the bolt against the underside of a work bench or the like and, in co-operation with the upper arm 14 of the casting, to firmly hold the device relative to the work bench. The bolt 11 is tightened, in use of the device, by means of lever 15 which slides through a hole in the bolt. The clamping member per se is well known.

The clamping member 10 accommodates one end of a short shaft 16 which is located in a bore in the member 10 and is locked firmly in position by a pin (not shown) which passes through the shaft and casting at point 17. A Sellock (reg. Trade Mark) pin is suitable for this purpose. The shaft 16 supports a further casting 18 rotatably arranged on the shaft 16. The further casting 18 is thus capable of rotating about an axis x — x as shown and may be locked in any rotated position by a locking bolt (not shown) which is arranged in the hole 19. The locking bolt traverses the shaft 16 and is adapted to draw together two collar members (not shown), each of which has a tapered portion for bearing on the shaft 16. The locking bolt screws into one of the collars and has a flange part for bearing on the other collar. The locking bolt is rotated by means of a lever (not shown) similar to the lever 15. The casting 18 is retained on the shaft 16 by a pin 20 which is located in a groove around the end of the shaft 16 as shown.

The casting 18 accommodates a further shaft 21 which is rotatably arranged within the casting 18 and is capable of being locked against rotation by means of a locking bolt arrangement 22 and lever 23 similar to those previously described for locking the shaft 16. The shaft 21 is adapted to rotate about an axis y — y at right angles to the axis x — x. A domed cap member 24 is arranged on top of the shaft 21 and is retained thereon by a series of radial rivets 25 which are accommodated in radial holes spaced around the cap member 24 and extending through the member 24 and into the shaft 19. The domed cap member 24 bears on a top surface of the casting 18 at 26 and thus retains the shaft 21 against downward movement. Upward movement of the shaft 21 is prevented by circlip (not shown) arranged in the groove 27 at the bottom end of the shaft 21. A collar member 28 sits on top of the shaft 21 within the cap member 24 and a key (not shown) located in a suitable key-way (not shown) locks the collar against rotation with respect to the cap member 24.

A ball member 29 is arranged within the domed cap 24 and sits in a part spherical cavity in the top of the collar 28. The ball supports a workpiece mounted member 30 which is connected to the ball via a neck portion 31 having an enlarged part 32 which is accommodated in a suitable cavity in the workpiece mounting member 30. The member 30 is retained on the enlarged part 32 by a pin (not shown) which passes through a suitable hole in the member 30 and into the enlarged part 32. The pin is arranged on the axis 33. The neck portion 31 is formed integral with the ball 29 and passes through a slot 34 which extends from the top of the cap member 24 down to the base of the cap member. Thus the ball is capable of rotating in the cap member 24 so as to cause the workpiece mounting member 30 to rotate about the axis y — y. Furthermore, the ball member may rotate in a manner causing the neck portion 31 to move down the slot 34 such that the workpiece mounting member 30 assumes a position as shown which is inclined at 90° to the original position. The workpiece mounting member 30 may also be caused to assume any position therebetween and is locked in the required position by means of a push rod (not shown) located in bore 35 which is forced against the underside of the collar 28 causing the collar to lock against the ball 29. The collar is forced upwardly to cause locking of the ball by means of a bolt 39 screwed into the bore 36 so as to force the push rod in an upward direction. The bolt for this purpose is rotated by a lever 37 similar to the levers previously described. It has been found that a ball which is not perfectly round but which has an eccentricity of about seven thousands of an inch in a diameter of about 1⅛" improves locking of the ball and also prevents the workpiece from dropping suddenly as the bolt 39 is loosened. When the workpiece mounting member 30 is moved to the downward position shown whereby it assumes a position disposed at 90° to the horizontal position it is retained against further downward movement by a boss 38 which projects from the cap member 24 through the slot 34. The boss member 38 is attached to the shaft 21 by means of a bolt which passes through the centre of the boss 38 and screws into the shaft 21.

It should be apparent that by rotating the bolt 39 in bore 36 so as to release the force of the push rod (not shown) in bore 35 on the collar 28, the ball 29 is released for movement whereby the workpiece mounting member 30 may be tilted through 90° in the direction of the slot 34. Furthermore, the cap member 24 may be rotated by releasing the locking bolt 22 so as to enable the shaft 21 to which the cap member 24 is rigidly affixed, to rotate about the axis y — y. Thus, by a combination of tilting the workpiece mounting member 30 and rotation of the cap member 24 a workpiece attached to the member 30 may be oriented in any angular position in a hemisphere above a horizontal plane through the centre of the ball 29. Simply by releasing the casting 18 for rotation about the shaft 16, the workpiece may be oriented in any angular position whatsoever. In other words, the workpiece may be oriented in an infinite number of angular positions.

According to a modified form of the embodiment, the shaft 21 may be made longer enabling the workpiece to be raised and lowered merely by sliding the shaft 21 along the axis y — y within the casting 18. Such longitudinal movement of the shaft 21 is restrained by the locking bolt 22 which also serves to lock the shaft 21 against rotational movement.

It will be obvious to those skilled in the art that numberous modifications and variations to the embodiment described above may be readily effected by persons skilled in the art. In the embodiment described, the workpiece mounting member 30 is shown simply as a disc member to which any one of a plurality of different brackets for attaching various transmissions and cylinder heads to the device may be connected. The brakcets each comprise a base member for sliding in the channel 40 to be retained therein by a locking member (not shown) which passes through the mounting member 30 and engages the base of the bracket. Alternatively, the workpiece mounting member 30 may comprise conventional vice jaws arranged in a manner such that the fixed jaw is connected to the ball 29 and the movable jaw is arranged on the fixed jaw to slide with respect thereto.

Whilst the embodiment above has been described with the device in an orientation wherein the axis x — x is arranged horizontal and the axis y — y vertical, it should be appreciated that the device may be attached to a bench, machine tool or the like in any orientation. For example, the clamp may be a pipe clamp enabling the device to be clamped to a pipe or other circular member in which case it is often desirable to orientate the device in other than the conventional position described.

We claim:
1. A work support device comprising:
   a first member adapted to be attached to a work bench or the like;
   a second member rotatably connected to said first member and adapted to rotate relative thereto about a first axis;
   first locking means adapted to lock said second member from rotation about said first axis;
   a third member rotatably connected to said second member and adapted to rotate relative thereto about a second axis;
   a ball and socket joint connecting said third member to a work piece mounting means, said joint permitting said mounting means to rotate relative to said third member about a third axis and permitting angular displacement of said third axis with respect to said second axis between a position co-incident with said second axis and a position perpendicular to said second axis;
   third locking means adapted to lock said work piece mounting means from rotation and angular displacement with respect to said third member; and
   said ball eccentrically formed to prevent sudden unlocking of said ball as said locking force is removed.
2. The work support device claimed in claim 1, wherein
   said first axis and said second axis are perpendicular with respect to one another.

* * * * *